L. A. OGDEN.
DEVICE FOR ADJUSTABLY CONNECTING ALINED RODS.
APPLICATION FILED MAY 7, 1917.
1,265,104.
Patented May 7, 1918.
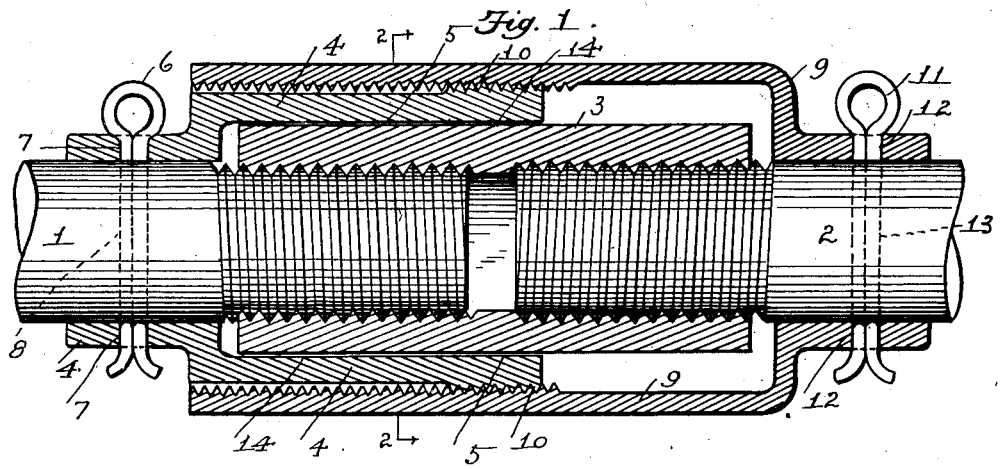
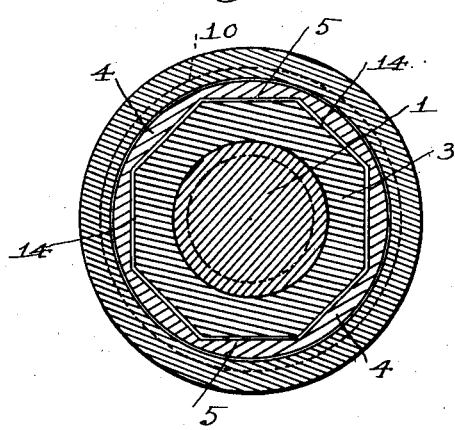
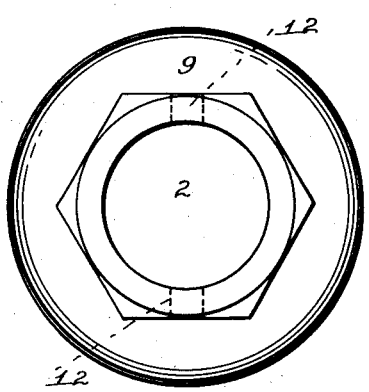
Witness
D. W. Bradford
Inventor
Leroy A. Ogden.
By Cyrus W. Rice
his Attorney ns with the parts in the
UNITED STATES PATENT OFFICE.

LEROY A. OGDEN, OF GRAND RAPIDS, MICHIGAN.

DEVICE FOR ADJUSTABLY CONNECTING ALINED RODS.

1,265,104.  Specification of Letters Patent.  Patented May 7, 1918.

Application filed May 7, 1917. Serial No. 166,790.

*To all whom it may concern:*

Be it known that I, LEROY A. OGDEN, a citizen of the United States, residing at Grand Rapids, in the county of Kent and State of Michigan, have invented new and useful Improvements in Devices for Adjustably Connecting Alined Rods, of which the following is a specification.

The present invention relates to devices for adjustably connecting alined rods; and its object is to provide means for preventing the accidental rotation of turnbuckles; and further, to provide reinforcing means therefor; and further, to provide means for protecting the same from dirt, etc.

These objects are attained by, and the invention finds preferable embodiment in, the structure hereinafter described and illustrated by the accompanying drawings, in which:—

Figure 1 is a longitudinal central section of a turnbuckle and connected parts;

Fig. 2 is a transverse section of the same taken on a plane corresponding to line 2—2 of Fig. 1; and Fig. 3 is a right-hand end view of the same.

In the embodiment of the invention chosen for illustration by the drawings and for detailed description in the body of this specification, the oppositely threaded alined rods 1, 2 are longitudinally adjustably connected by the turnbuckle 3 oppositely threaded internally on the rods as shown, and polygonal in cross-section. A primary sleeve 4 around one rod 1 and the turnbuckle, is slidable longitudinally therealong, a portion 5 of its inner surface being shaped correspondingly to the polygonal outer surface 14 of the turnbuckle, so that although said sleeve and the turnbuckle are relatively movable longitudinally, they are not relatively rotatable. Means for holding this sleeve 4 on the rod 1 against movement, rotatable and longitudinal, are provided, comprising the cotter 6 thrust through the orifices 7 in said sleeve and the orifice 8 in said rod. A secondary sleeve 9 around the rod 2 and movable rotatably and longitudinally thereon, is threaded at 10 on the primary sleeve 4 and is held against movement, rotatable and longitudinal, as by the cotter 11 thrust through the orifices 12 in said sleeve and the orifice 13 in said rod. When the turnbuckle is turned to effect the desired adjustment of the rods relatively to each other longitudinally, the primary sleeve 4 is secured against movement by its cotter 6: the secondary sleeve 9 is turned on its threads 10 on the primary sleeve and is held against movement by its cotter 11.

It will be seen that, with the parts in the position described and shown, the turnbuckle cannot accidentally rotate; that the connection of the rods to each other is reinforced by the mutually threaded sleeves and their cotters; and that the sleeves surrounding the turnbuckle, as they do, exclude dirt, etc., therefrom.

The invention being intended to be defined solely by the claims, is not to be limited to or by details of construction shown or described.

I claim:

1. In a device of the character described for adjustably connecting alined rods; a turnbuckle connecting the rods; a primary sleeve around the turnbuckle and one rod, said sleeve being held against rotation relatively to the turnbuckle; means for holding the primary sleeve against rotation relatively to said rod; a secondary sleeve around the other rod and threaded on the primary sleeve.

2. In a device of the character described for adjustably connecting alined rods; a polygonal turnbuckle connecting the rods; a primary sleeve around the turnbuckle and one rod and movable longitudinally relatively thereto and having a portion of its inner surface corresponding to, slidable on, and non-turnable relatively to, the turnbuckle; means for holding the primary sleeve on said rod against movement; a secondary sleeve around the other rod and threaded on the primary sleeve; and means for holding the secondary sleeve on said second rod against movement.

In testimony whereof I have hereunto set my hand.

LEROY A. OGDEN.